US010637092B2

(12) United States Patent
Ogawa et al.

(10) Patent No.: US 10,637,092 B2
(45) Date of Patent: Apr. 28, 2020

(54) METHOD FOR MANUFACTURING SECONDARY BATTERY

(71) Applicant: SEKISUI CHEMICAL CO., LTD., Osaka (JP)

(72) Inventors: Hiroshi Ogawa, Tsukuba (JP); Mitsuhide Nogami, Tokai (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 432 days.

(21) Appl. No.: 15/509,535

(22) PCT Filed: Sep. 18, 2015

(86) PCT No.: PCT/JP2015/076734
§ 371 (c)(1),
(2) Date: Mar. 8, 2017

(87) PCT Pub. No.: WO2016/043319
PCT Pub. Date: Mar. 24, 2016

(65) Prior Publication Data
US 2017/0263970 A1    Sep. 14, 2017

(30) Foreign Application Priority Data

Sep. 18, 2014    (JP) ................................. 2014-190127

(51) Int. Cl.
*H01M 10/04*        (2006.01)
*H01M 2/02*         (2006.01)
(Continued)

(52) U.S. Cl.
CPC .............. *H01M 10/04* (2013.01); *B65B 9/02* (2013.01); *B65B 31/00* (2013.01); *B65B 51/22* (2013.01);
(Continued)

(58) Field of Classification Search
CPC .. H01M 10/04; H01M 2/0212; H01M 2/0275; H01M 2/08; H01M 10/0413; B65B 9/02; B65B 31/00; B65B 51/22
See application file for complete search history.

(56) References Cited

U.S. PATENT DOCUMENTS

2003/0049527 A1* 3/2003 Yageta .................. H01M 2/021
                                                        429/179
2014/0059875 A1* 3/2014 Yuhara .............. H01M 10/0404
                                                        33/613

FOREIGN PATENT DOCUMENTS

EP      2816650        12/2014
JP      2-18892 A       1/1990
(Continued)

OTHER PUBLICATIONS

English machine translation of Yoon et al. (KR 20140068551 A) (Year: 2014).*

(Continued)

*Primary Examiner* — Brian R Ohara
(74) *Attorney, Agent, or Firm* — Greenblum & Bernstein, P.L.C.

(57) ABSTRACT

A method for manufacturing a secondary battery having a film package by covering upper and lower sides of a laminate structure constituting a battery with a pair of film materials respectively and bonding the film materials together sequentially in a process direction from one end of the film materials to the other, the method including overlapping the film materials such that the laminate structure is sandwiched therebetween, and sealing one end of the overlapping part of the films, the one end being located at an upstream of the process direction, and bonding the overlapped film materials together at one or each of side portions thereof extending along the process direction sequentially in the process direction, while pressing a middle portion of the (Continued)

overlapped film materials sequentially in the process direction to thereby degas an internal space between the film materials, the middle portion being located between the side portions.

3 Claims, 9 Drawing Sheets

(51) Int. Cl.
*H01M 2/08* (2006.01)
*B65B 9/02* (2006.01)
*B65B 31/00* (2006.01)
*B65B 51/22* (2006.01)

(52) U.S. Cl.
CPC ....... *H01M 2/0212* (2013.01); *H01M 2/0275* (2013.01); *H01M 2/08* (2013.01); *H01M 10/0413* (2013.01)

(56) References Cited

FOREIGN PATENT DOCUMENTS

| | | | |
|---|---|---|---|
| JP | 2-72556 A | | 3/1990 |
| JP | 2003-7344 A | | 1/2003 |
| KR | 20140068551 A | * | 6/2014 |
| WO | 99/040634 A1 | | 8/1999 |
| WO | 2013/122094 | | 8/2013 |

OTHER PUBLICATIONS

English machine translation of Yasushi et al. (JP H0272556 A) (Year: 1990).*
Official Communication issued in European Patent Office (EPO) Patent Application No. 15841545.5, dated Feb. 22, 2018.
Search Report issued in International Bureau of WIPO Patent Application No. PCT/JP2015/076734, dated Nov. 10, 2015.

* cited by examiner

METHOD FOR MANUFACTURING SECONDARY BATTERY

TECHNICAL FIELD

The present invention relates to a method for manufacturing a secondary battery.

Priority is claimed on Japanese Patent Application No. 2014-190127, filed Sep. 18, 2014, the contents of which are incorporated herein by reference.

DESCRIPTION OF RELATED ART

As a method for manufacturing a secondary battery, a method is known in which a laminate of a positive electrode plate and a negative electrode plate is placed in a package, and the package is decompressed or degassed, followed by sealing the package (see, for example, Patent Document 1). Conventionally, as a method for degassing the package, a decompression under vacuum atmosphere in a vacuum chamber or the like is widely known.

DOCUMENTS OF RELATED ART

Patent Document

[Patent Document 1] Publication of Japanese translation of International Patent Application Publication No. 99/040634

SUMMARY OF THE INVENTION

Problems to be Solved by the Invention

However, a device such as a vacuum chamber is expensive; therefore, the use of a large vacuum chamber especially for manufacturing large secondary batteries results in an increased equipment cost and a larger energy consumption. That is, the conventional method for manufacturing a secondary battery has a problem that the production cost is high, which makes it difficult to provide especially large secondary batteries at low cost.

In view of the above problem, the present invention provides a method for manufacturing a secondary battery that can reduce the manufacturing cost by suppressing equipment cost and energy consumption.

Means to Solve the Problems

The method of the present invention is a method for manufacturing a secondary battery having a film package by covering upper and lower sides of a laminate structure constituting a battery with a pair of film materials respectively and bonding the film materials together sequentially in a process direction from one end of the film materials to the other. Specifically, the method of the present invention comprises: a first sealing step of overlapping a pair of film materials such that a laminate structure constituting a battery is sandwiched therebetween, and sealing one end of the overlapping part of the films, the one end being located at an upstream of the process direction; and a second sealing step of bonding the overlapped film materials together at one or each of side portions thereof extending along the process direction sequentially in the process direction, while pressing a middle portion of the overlapped film materials sequentially in the process direction to thereby degas an internal space between the film materials (i.e., a space accommodating the laminate structure), the middle portion being located between the side portions.

In the present invention, the phrase "sealing one end of the overlapping part of the films, the one end being located at an upstream of the process direction" encompasses not only a fluid-tightly bonding of the end portions of the overlapped film materials, but also other sealing methods such as a method of forming a film material into a closed state by folding the film material into a bag shape, that is, the phrase means that any means is employable as long as a fluid-tight state is established in the film package. On the other hand, in the present invention, the term "bonding" means to cause the intermolecular force of molecules constituting the surfaces of two objects to be exerted such that the surfaces which are brought into contact with each other do not easily separate from each other.

According to this configuration, in the process of sealing one end of the overlapping part of the films, the one end being located at an upstream of the process direction, it is possible to degas an internal space between the film materials by pressing a middle portion of the overlapped film materials.

In the present invention, in the second sealing step, the side end portions may be bonded in advance of pressing the middle portion as viewed with respect to a direction corresponding to a single straight line orthogonal to the process direction.

According to this configuration, it is possible to prevent the liquid or semi-solid electrolyte from overflowing from one or both of both side end portions of the film materials.

In the present invention, a plurality of embossed portions may be formed on at least one of the pair of film materials, and a portion corresponding to the internal space between the film materials may be surrounded by the embossed portions and hypothetical lines connecting the embossed portions.

According to this configuration, it is possible to prevent unnecessary wrinkles from occurring in the film materials when the laminate structure is sandwiched between the overlapped film materials. Therefore, the degassing in the second sealing step can be appropriately performed.

The method of the present invention may further comprises, prior to the first feeding step, a film material feeding step of continuously or intermittently sending out the pair of film materials which are in a strip form while maintaining the film materials to face each other, and feeding the sent-out pair of the film materials to the first sealing step, wherein the first sealing step and the second sealing step are repeated in accordance with the sending-out of the strip-formed film materials to thereby continuously or intermittently manufacture a secondary battery having a film package.

According to this configuration, each step of producing the package for the secondary battery can be efficiently performed continuously or intermittently.

Effect of the Invention

The method of the present invention has an effect that a secondary battery can be manufactured while suppressing equipment cost and energy consumption.

DESCRIPTION OF THE EMBODIMENTS

Hereinbelow, the embodiments of the method of the present invention for manufacturing a secondary are described with reference to the drawings.

Figure 1:
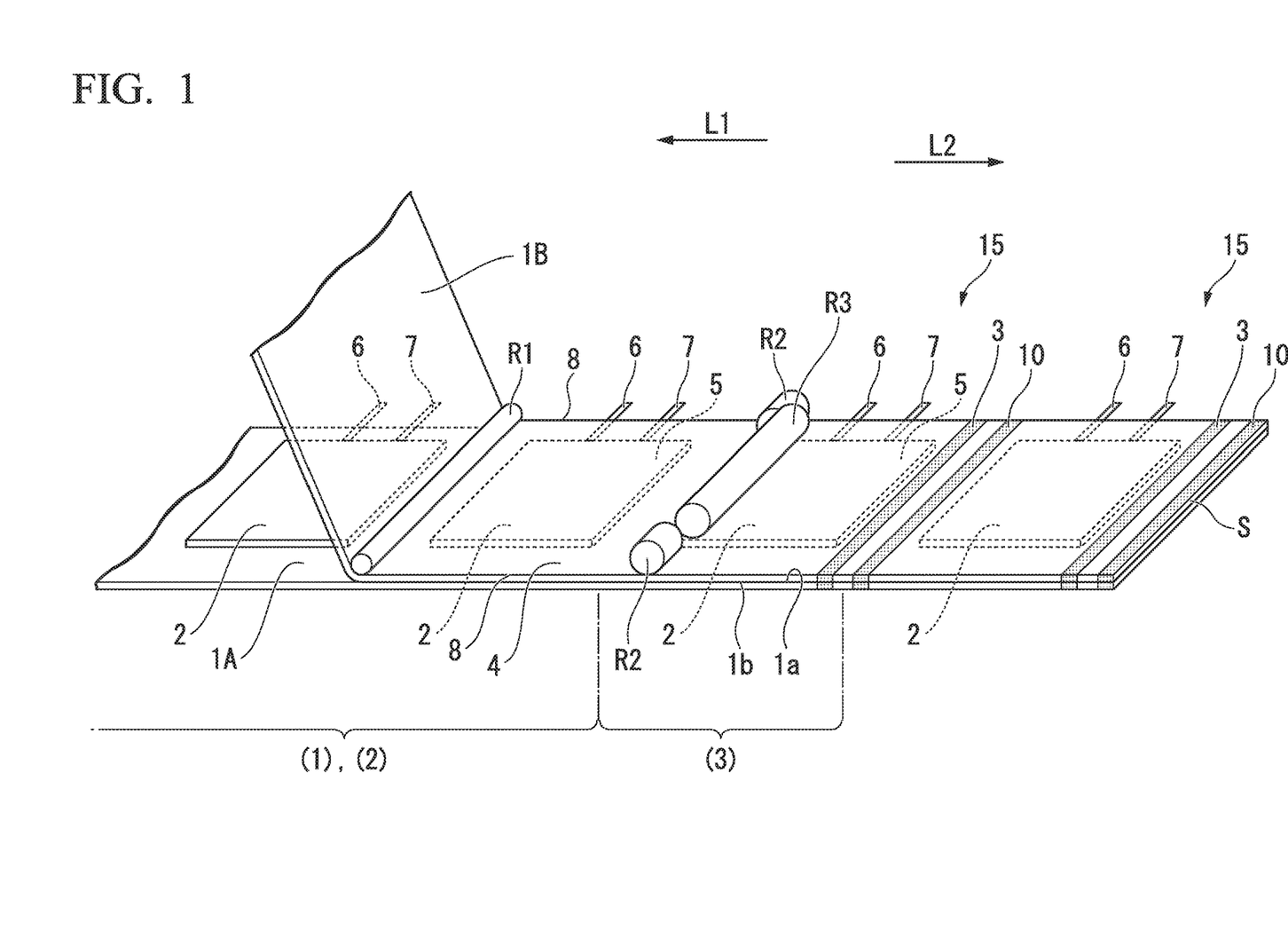
FIG. 1 is a perspective view schematically showing the method for manufacturing a secondary battery according to one embodiment of the present invention.

As shown in FIG. 1, the method according to one embodiment of the present invention comprises at least the following steps:

(1) a film material feeding step of continuously or intermittently sending out a pair of film materials 1A,1B which are in a strip form while maintaining the film materials to face each other, (2) a first sealing step of overlapping the film materials 1A,1B such that a laminate structure 2 constituting a battery is sandwiched therebetween, and sealing one end 3 of the overlapping part of the film materials 1A,1B, the one end 3 extending along a side is located at an upstream of the process direction L1, and (3) a second sealing step of bonding the overlapped film materials 1A,1B together at one or each of its side end portions 4,4 located at sides 8,8 extending along the process direction L1 sequentially in the process direction L1 toward a direction away from the process starting end 3, while pressing a middle portion of the overlapped film materials 1A,1B sequentially in the process direction L1 to thereby degas an internal space 5 between the film materials 1A,1B, the middle portion being located between the side end portions 4,4.

In FIG. 1, the portions corresponding to the steps (1), (2) and (3) are shown.

(1) Film Material Feeding Step

As shown in FIG. 1, in the film material feeding step, a pair of film materials 1A,1B which are in a strip form are continuously or intermittently sent out while maintaining the film materials 1A,1B to face each other.

For example, the film materials 1A,1B which have been kept in rolled state or the like are fed in one direction.

The feeding is performed continuously or intermittently at a predetermined speed or with a predetermined interval according to the time required for the work in the later process.

Each of the film materials 1A,1B may be a sheet-like member having a predetermined thickness, which is formed from a material such as a metal material such as aluminum, stainless steel or brass, or a polymer film such as a polyester resin, a polyolefin resin or a polyamide resin.

Further, the film material 1 may be configured as a laminate film of a metal and a resin. As such a laminate film, any known package films for lithium batteries can be used. Examples of combinations for lamination include a lamination of aluminum and a polyester resin, and a lamination of stainless steel and a polypropylene resin. The film materials 1A,1B may have a thickness of about 10 to 800 µm, preferably about 50 to 200 µm. It is more preferable that each of the film materials 1A,1B is an adhesive laminate material. The use of laminate films as the film materials 1A,1B makes it easy to bond the open end portions 4, 4 when forming the package by overlapping the pair of film materials 1A,1B.

(2) First Sealing Step

In the first sealing step, the film materials 1A,1B are overlapped with a laminate structure 2 constituting a battery sandwiched between the film materials 1A,1B, and one end 3 of the overlapping part of the film materials 1A,1B is sealed, the one end 3 extending along a side s (width direction of the film materials 1A,1B in this embodiment) located at an upstream of the process direction L1.

Although not shown in detail, the laminate structure 2 constituting the battery is formed by laminating a positive electrode plate and a negative electrode plate through a spacer such as a separator so as to prevent these electrode plates from being in direct contact with each other. Between the positive electrode plate and the negative electrode plate is interposed a liquid electrolyte, a semi-solid (gel) electrolyte, or a solid electrolyte formed so as to include a liquid or semi-solid electrolyte. The positive electrode plate is a member in which a positive electrode active material layer is provided on a positive electrode current collector, to which a terminal 6 is connected. The negative electrode plate is a member in which a negative electrode active material layer is provided on a negative electrode current collector, to which a terminal 7 is connected.

The film material 1A is disposed on a base 11 (see FIG. 2), and the laminate structure 2 is disposed on this film material 1A. During this process, the terminals 6, 7 of the laminate structure 2 are caused to protrude from one of the side end portions 4, 4 of the film material 1A. The film material 1B is overlaid on the film material 1A on which the laminate 2 has been disposed by, for example, using the roller R1 or the like such that surfaces 1a and 1b are disposed opposite to each other, while interposing the laminate structure 2 between the pair of film materials 1A,1B.

Next, on a side closer to the front end in the feeding direction (direction of arrow L2) of the film materials 1A,1B than the internal space 5 formed between the pair of film materials 1A,1B, the film materials 1A,1B are bonded together along sides 8,8 in the width direction of the film materials 1A,1B. Here, the bonded portion is the closed end portion 3 along one side s.

The bonding of the end portion 3 is performed by ultrasonic fusion bonding, laser welding, heat sealing such as lamination fusion when the film materials 1A,1B are laminate films, bonding using a sealing material such as an adhesive or a hot-melt adhesive, or other known means.

(3) Second Sealing Step

In the second sealing step, the pair of film materials 1A,1B are bonded together at portions of the process starting end 3 corresponding to the side end portions 4,4 sequentially in the process direction L1 (i.e., toward a direction away from the process starting end 3), and are further pressed at a portion of the process starting end 3 corresponding to a middle portion located between the side end portions 4,4 sequentially in the process direction L1 from the process starting end 3, to thereby degas an internal space 5 between the film materials 1A,1B.

The bonding of the both side end portions 4,4 is performed by bonding using a sealing material such as an adhesive or a hot-melt adhesive, lamination fusion when the film materials 1A,1B are laminate films, ultrasonic fusion bonding, heat sealing such as laser welding, or other known means.

The pressing can be performed by a method using a pressing member R2 (a roller in the present embodiment) in which the film materials 1A,1B are transported in a direction of the arrow L2 relative to the pressing member R2. More specifically, for example, the film materials 1A,1B are transported while being continuously or intermittently fed in one direction (the direction of the arrow L2) and are passed through the fixed pressing member R2.

During this process, the pressing member R3 such as a roller is used to transport the film materials 1A,1B from the process starting end 3 in the direction of the arrow L2 relative to the pressing member R3, thereby pushing out the gas from the internal space 5 formed between the side end portions 4,4 of the film materials 1A,1B.

Figure 2:
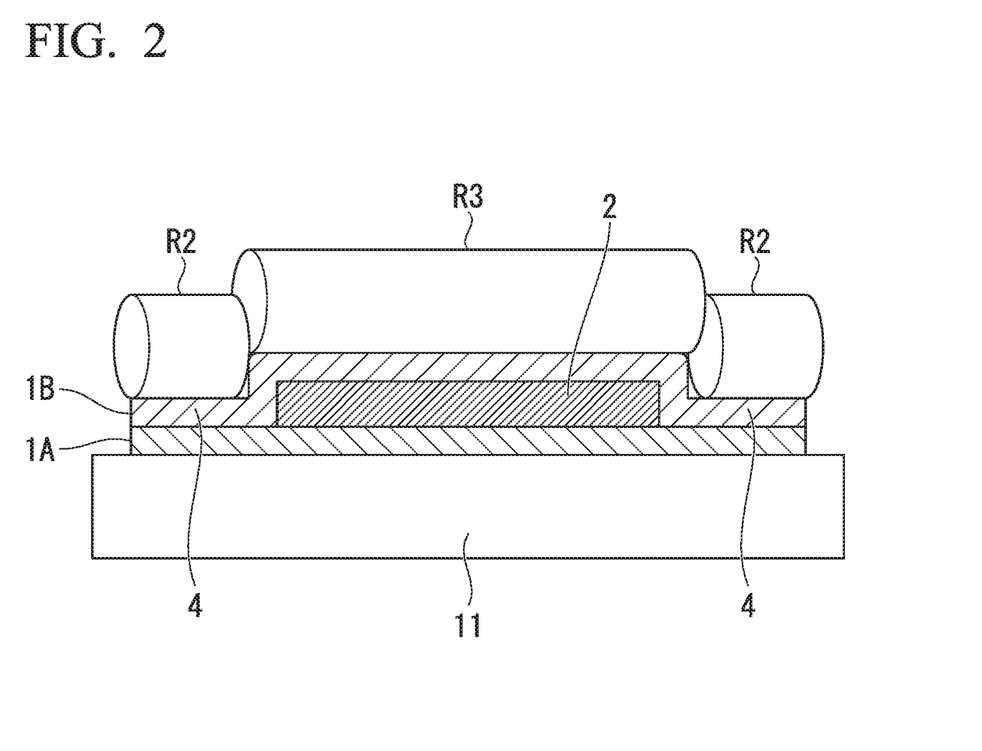
FIG. 2 is a front cross-sectional view schematically showing one step of the method for manufacturing a secondary battery according to one embodiment of the present invention.

As the pressing member R3 used for pressing the internal space 5, one as shown in FIG. 2 can be preferably used, which is formed of a material that is flexibly and elastically deformable according to the shape of the laminate structure 2.

The pressing members R2,R3 may be provided as a unified body where the pressing members R2,R3 are formed integrally with each other as long as the pressing members R2,R3 can deform flexibly and elastically or move appropriately according to the shapes of the film materials 1A,1B and the laminate structure 2.

The pressing is carried out at such a pressure as to allow the gas to move in one direction while causing the liquid or semi-solid electrolyte contained in the laminate structure 2 to slightly overflow.

When the film materials 1A,1B are pressed while being moved relatively to the pressing member R3 such as a roller in the direction of the arrow L2 from the process starting end 3, the film materials 1A,1B may be heated by a heating means. The heating of the film materials 1A,1B with the heating means can soften the electrolyte and the like inside the film materials 1A,1B, whereby the gas in the internal space 5 can be more easily discharged. The heating means may be an infrared heater, hot air, heated pressing members R2,R3, or the like. The heating temperature may be appropriately selected depending on the types of the film material, the material of the electrolyte and the like, but it is preferable to choose a temperature such that the internal temperature of the heated film materials becomes 40 to 150° C., more preferably 50 to 80° C.

Further, as shown in FIG. 1, the pressing is preferably performed at a time later than the bonding of the side end portions 4,4 of the film materials 1A,1B as viewed with respect to a position on a single straight line orthogonal to the process direction, namely with such a timing that the pressing is performed at a position upstream of (i.e., at a position closer to the process starting end 3 than) the position where the bonding of the side end portions 4,4 are being performed so that the bonding of the side end portions 4,4 are followed by the pressing. The heating of the film materials 1A,1B may be performed slightly earlier than or substantially simultaneously with the timing of the pressing of the film materials 1A,1B. More simply stated, there is no particular limitation about the heating as long as the film materials 1A,1B, the electrolyte, etc. can be appropriately softened when pressing the film materials 1A,1B.

By delaying the timing of pressing of the internal space 5 relative to the timing of pressing of the side end portions 4,4 of the film materials 1A,1B in this manner, the side end portions 4,4 of the film materials 1A,1B can be bonded to each other before the liquid or gel electrolyte is pushed out. Further, this delayed pressing can prevent overflow of the liquid or semi-solid electrolyte contained in the laminate structure 2 to both side end portions 4,4 of the film materials 1A,1B, whereby it becomes possible to push out the liquid or semi-solid electrolyte pushed out in the process direction L1 toward the laminate structure 2 disposed adjacent to each other in the process direction L1.

As a result, it becomes possible to prevent the adhesive strength between the film materials 1A,1B from decreasing due to the adhesion of the liquid or semi-solid electrolyte to the side end portions 4,4 of the film materials 1A,1B. Further, it also becomes possible to prevent the loss of raw materials due to the overflow of the liquid or semi-solid electrolyte to the sides of the film materials 1A,1B.

The second sealing process is completed when the laminate structure 2 has been completely interposed between the pair of film materials 1A,1B, and the bonding of the side end portions 4,4 of the film materials 1A,1B and the degassing of the internal space 5 have been done to a position ahead of the laminate structure 2.

Thereafter, the film materials 1A,1B are bonded along their sides 8,8 at a position 10 ahead of the laminate structure 2 as viewed in one direction (i.e., at a front end side peripheral portion of the laminate structure 2 positioned opposite to the process starting end 3), whereby the internal space 5 is completely sealed, and the manufacture of the secondary battery 15 is completed.

By repeating the first sealing step and the second sealing step according to the feeding of the film materials 1A,1B performed continuously or intermittently at predetermined intervals in the film material feeding step, it becomes possible to efficiently manufacture the secondary battery 15 having a film package constituted of the strip-formed film materials 1A,1B.

According to the method described above, the secondary batteries 15 are formed in a continuous strip shape, and these secondary batteries 15, 15 . . . may be used by connecting the terminals 6,7 in series or in parallel. Alternatively, the secondary batteries may be cut from each other by cutting between the process starting end portions 3 and 10.

As described above, according to the method of the present invention for manufacturing a secondary battery in the present embodiment, it is possible to easily manufacture the secondary battery 15 with its internal space 5 degassed without using equipment, such as a vacuum chamber, that is expensive and consumes a large amount of energy; therefore, the continuous manufacturing of the secondary batteries can be carried out at low cost and with high efficiency. Thus, the method for manufacturing a secondary battery 15 according to the present embodiment has an effect that the method enables inexpensive secondary batteries 15 to be supplied widely to the world. In particular, the method for manufacturing a secondary battery according to the present embodiment is advantageous in suppressing equipment cost for manufacturing a large secondary battery 15.

Further, in the method for manufacturing a secondary battery according to the present embodiment, a pair of film materials 1A,1B can be bonded together while degassing the internal space 5 in which the laminate structure 2 is disposed. This enables the method for manufacturing a secondary battery according to the present embodiment to exert an effect that the quality deterioration due to the presence of bubbles in the internal space 5 can be prevented.

Further, in the method for manufacturing a secondary battery according to the present embodiment, the side end portions 4,4 of the film materials 1A,1B are bonded together before the liquid or semi-solid electrolyte overflows from both sides 8,8 of the film materials 1A,1B. Therefore, the method for manufacturing a secondary battery according to the present embodiment can exert an effect to prevent the lowering of the adhesion strength between the side end portions 4,4 of the film materials 1A,1B, which is caused by the adhesion of the electrolyte to the adhesion surfaces of the side end portions 4,4.

Figure 3:
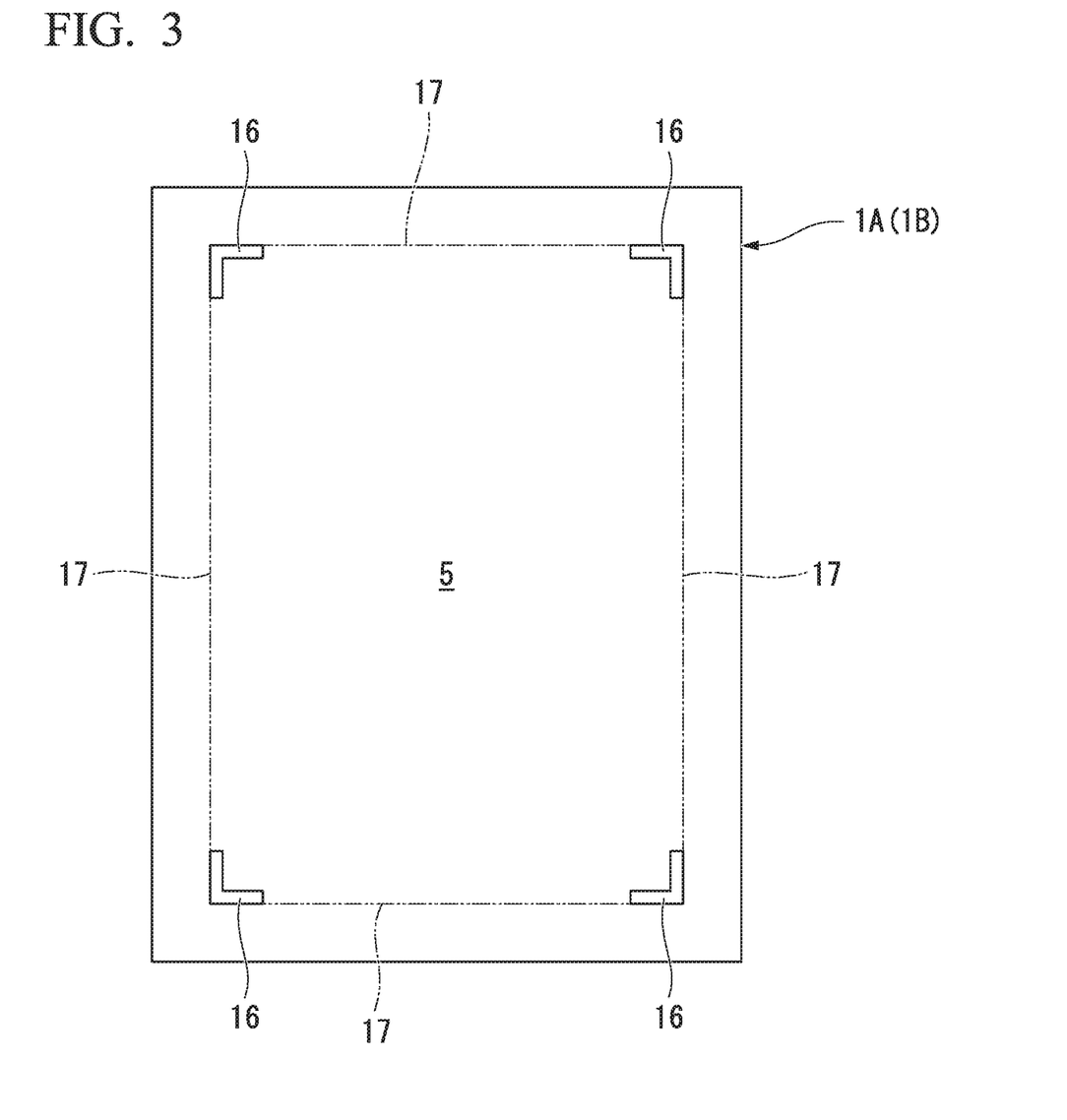
FIG. 3 is a plan view showing a film material used in the method for manufacturing a secondary battery according to one embodiment of the present invention.

Further, in the present embodiment, it is possible to use the film materials 1A,1B as shown in FIG. 3, which have a plurality of embossed portions 16,16 . . . formed thereon such that a portion corresponding to the internal space 5 of the film materials 1A,1B is surrounded by the embossed portions 6,6 . . . and hypothetical lines 17 connecting the embossed portions 16,16, and which has flexibility.

The embossed portions 16 are each formed in an approximately L shape as viewed in plan and a concave or convex shape as viewed in cross-section, and are positioned at corners of a rectangle surrounding a portion corresponding to the internal space 5 (space accommodating the laminate structure). The embossed portion 16 is preferably provided at least at one location along a portion of the film materials 1A,1B which abuts the outer periphery of the laminate structure, more preferably provided at two or more locations, more preferably at four or more locations. When the embossed portions 16 are provided at two or more locations, it is preferable that the intervals between the embossed portions on the portions abutting the outer periphery of the laminate structure are substantially equal. Further, one or more linear embossed portions (not shown) may also be formed on the hypothetical lines 17 connecting the embossed portions 16,16.

The embossed portion 16 is a portion to become an edge of the internal space 5 accommodating the laminate structure 2 when the pair of film materials 1A,1B are overlapped. When the laminate structure 2 is sandwiched and sealed, the film materials 1A,1B can be freely bent at the embossed portions 16,16, whereby a recess is easily formed between the film materials 1A,1B.

Figure 4:
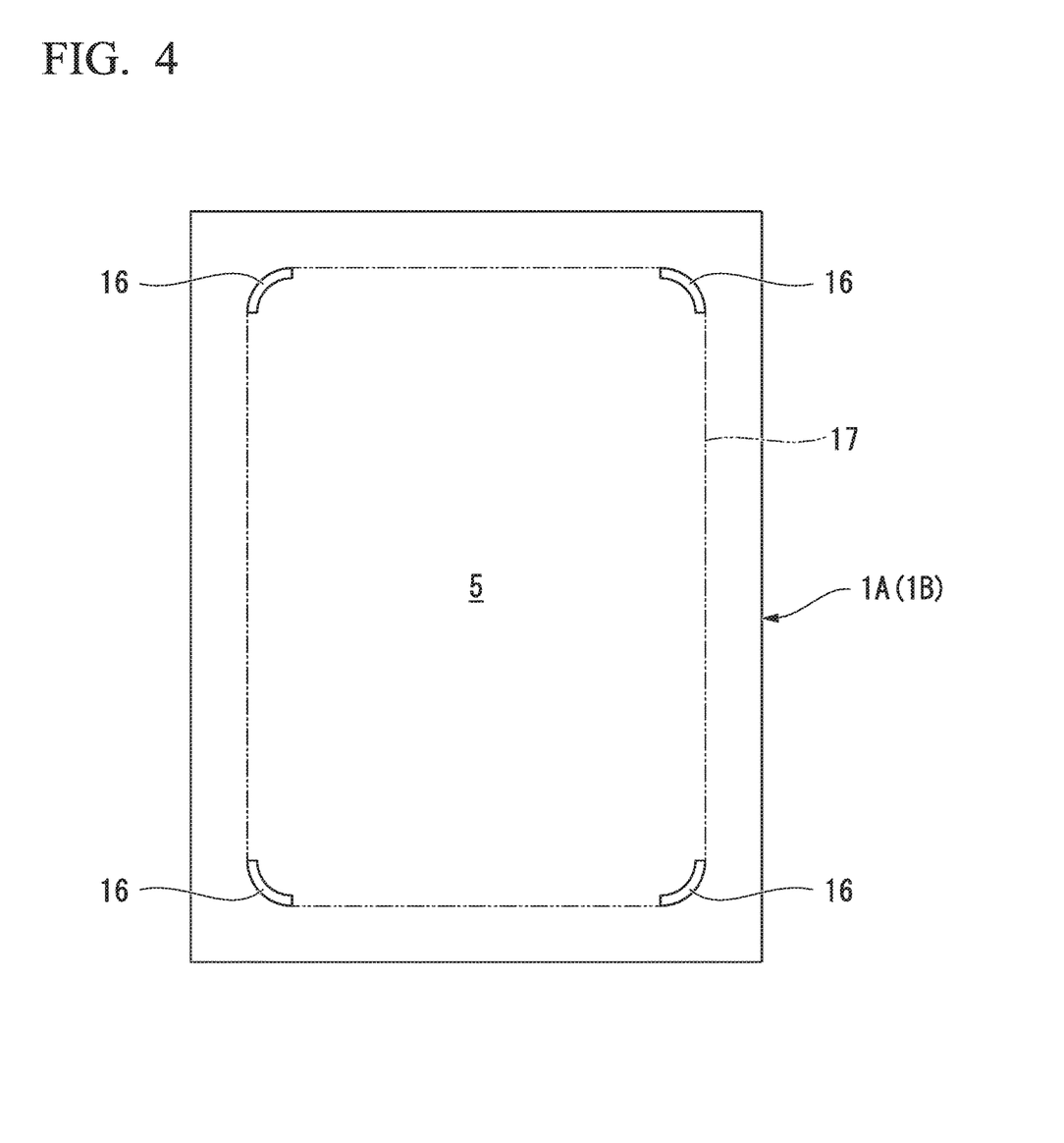
FIG. 4 is a plan view showing another example of a film material used in the method for manufacturing a secondary battery according to one embodiment of the present invention.

As shown in FIG. 4, the embossed portions 16, 16 may be formed to have an approximately semicircular shape. Whichever of the above shapes the embossed portions 16,16 have, the internal space 5 can be easily formed. Further, it is also possible to effectively suppress the occurrence of wrinkles in the film material 1A (1B) when the laminate 2 structure is covered by overlapping the pair of film materials 1A,1B, whereby the internal space 5 can be degassed appropriately.

The film material on which the embossed portions 16, 16 . . . are formed as described above may be used as one of the overlapped film materials 1A,1B.

Figure 5:
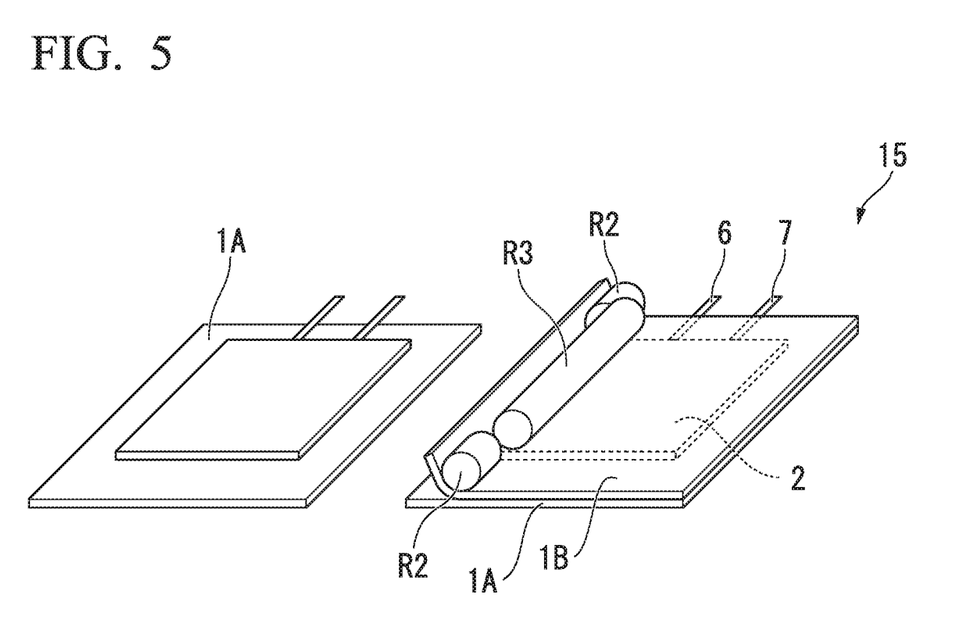
FIG. 5 is a perspective view schematically showing a modified example of the method for manufacturing a secondary battery according to one embodiment of the present invention.

The aforementioned embodiment is explained taking as an example the case where a plurality of secondary batteries 15 are manufactured in the longitudinal direction (one direction) of long strip-formed film materials 1A,1B. However, the method of the present invention can also be applied to the case where a single secondary battery 15 is manufactured using the film materials 1A,1B as shown in FIG. 5.

Even in the latter case, as in the aforementioned embodiment, the first sealing step and the second sealing step can be performed on the film materials 1A,1B, and the same functions and effects as in the case of the aforementioned embodiment can be obtained.

Further, the aforementioned embodiment is explained taking as an example the case where the pair of film materials 1A,1B separated from each other are used, and in the second sealing step, the side end portions 4,4 formed at the widthwise ends 8,8 of the film materials 1A,1B are bonded; however, the present invention is not limited to this example. That is, the method of the present invention may be performed as shown in FIG. 6 where a single film material 1C is folded at a center line in the longitudinal direction thereof as a folding line Y to overlap the halves 1A, 1B of the film material 1, followed by bonding the halves 1A,1B in the direction intersecting with the folding line Y in the first sealing step to form process starting end 3, and only the side end portion 4 opposite to the folded one end 8 is pressed and bonded in the second sealing step.

Figure 6:
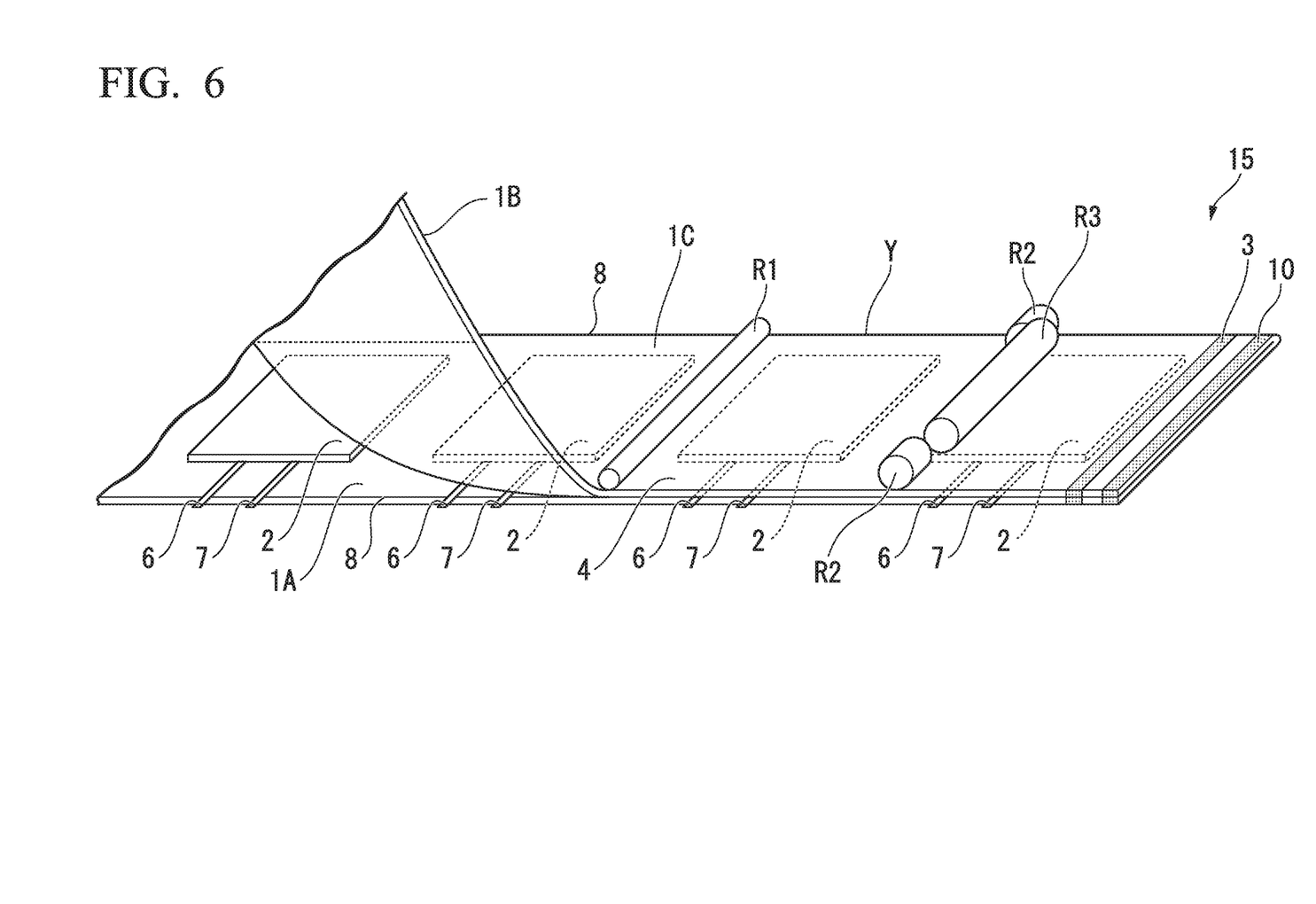
FIG. 6 is a perspective view schematically showing a modified example of the method for manufacturing a secondary battery according to one embodiment of the present invention.

Even in the case of the method of the modified example shown in FIG. 6, the film materials 1A,1B may be pressure-bonded or adhered to each other by a pressing member R2 with respect to areas thereof reaching the edge of the internal space 5 shown by the hypothetical lines at the side end portion 4 folded at the folding line Y into a bag shape. Even with such a side end portion 4 formed into a bag shape, pressure-bonding or adhering the film materials 1A,1B can prevent waste of the raw materials, which is caused by accumulation of the electrolyte in a space that is not required to be filled with an electrolyte. In addition, it is possible to prevent bubbles from remaining in the side end portion 4 formed into a bag shape.

Figure 7:
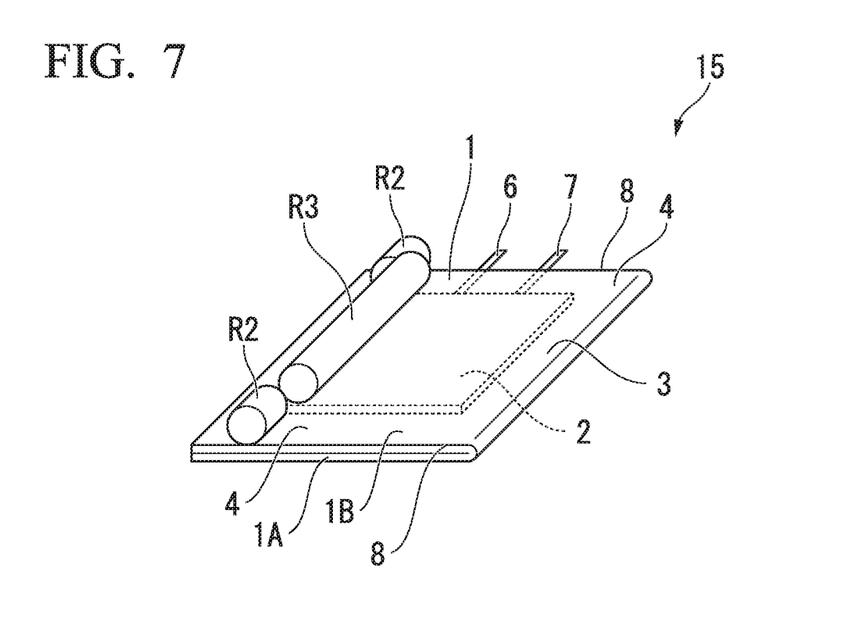
FIG. 7 is a perspective view schematically showing a modified example of the method for manufacturing a secondary battery according to one embodiment of the present invention.

Alternatively, the method of the present invention may be performed in a manner wherein the film material 1 is folded as shown in FIG. 7 to overlap the halves 1A,1B of the film material 1 so as to form the film material 1 into a bag shape, where the closed end portion of the bag-shaped film material is the process starting end 3, and the end portions along the both sides 8,8 at the process starting end 3 are bonded as the side end portions 4,4 in the second sealing step.

Thus, the method of the present invention can also be appropriately practiced even with a pair of film materials 1A,1B overlapped by folding the film materials 1A,1B.

Figure 8:
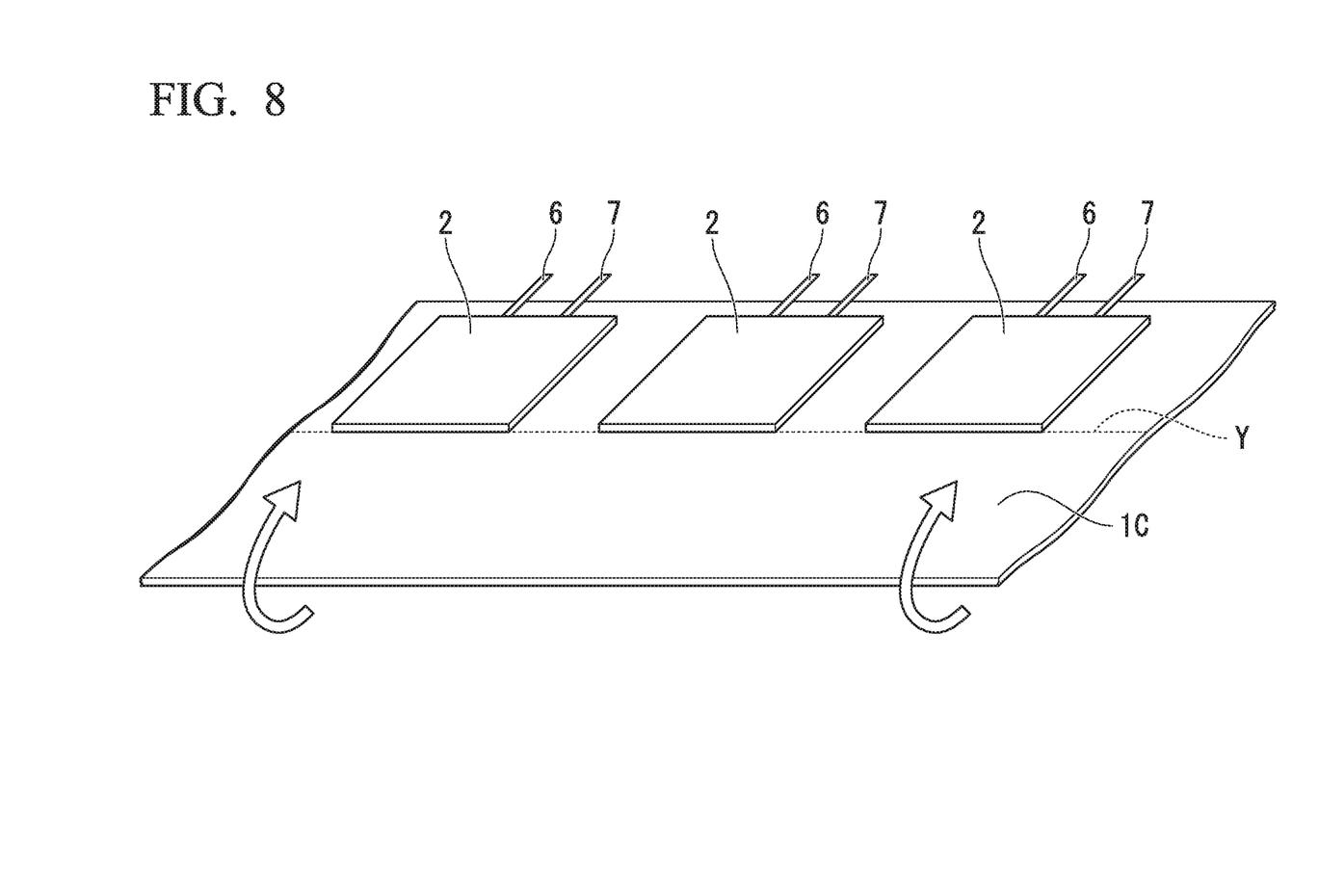
FIG. 8 is a perspective view schematically showing a modified example of the method for manufacturing a secondary battery according to one embodiment of the present invention.
Figure 9:
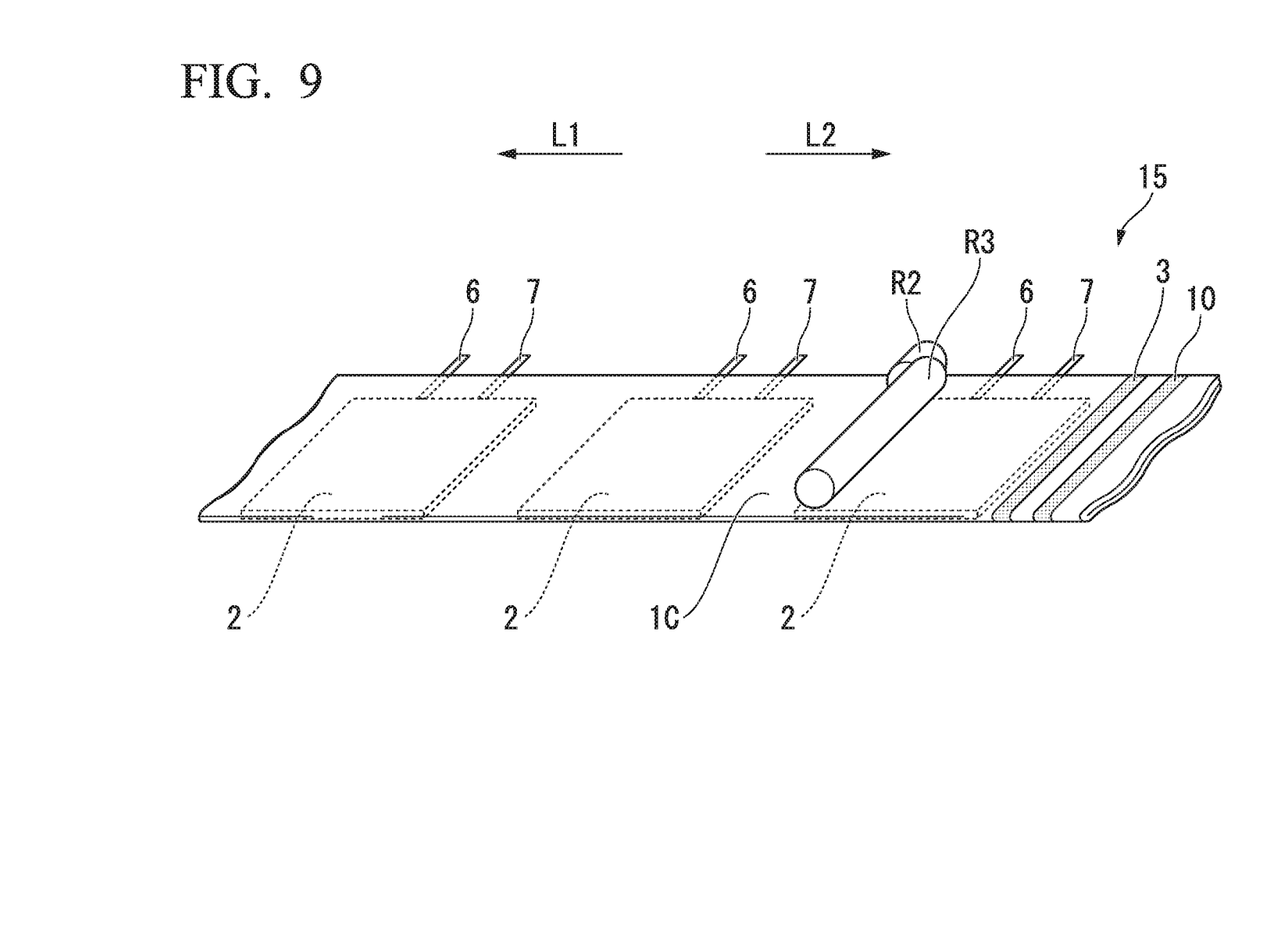
FIG. 9 is a perspective view schematically showing a modified example of the method for manufacturing a secondary battery according to one embodiment of the present invention.

Further, the method of the present invention may be performed as shown in FIGS. 8 and 9, wherein the laminate structure 2 is placed on a single film material 1C such that a side of the laminate structure 2 opposite to the side thereof where the terminals 6,7 are provided is positioned approximately on the center line (folding line Y) of the single film material 1C as viewed in the longitudinal direction thereof; the single film material 1C is folded in the direction shown by the arrow to overlap the halves 1A, 1B of the film material 1, followed by bonding the halves 1A,1B in the direction intersecting with the folding line Y in the first sealing step to form process starting end 3; and only the side end portion 4 opposite to the folded one end 8 is pressed and bonded in the second sealing step. In this case, only one side end portion 4 needs to be pressure-bonded, thereby bringing about advantages such as simplification of the manufacturing apparatus, further reduction of the energy consumption, and saving of materials.

Further, after the above process, a plurality of independent secondary batteries can be obtained by cutting the film material 1C at intermediate portions between the adjacent laminate structures 2,2.

DESCRIPTION OF THE REFERENCE SIGNS 1A,1B Film material
2 Laminate structure
3 End portion (process starting end)
4 Side end portion
5 Internal space
6,7 Terminals
8 One end
15 Secondary battery
16 Embossed portion
17 Hypothetical line

The invention claimed is:

1. A method for manufacturing a secondary battery having a film package by covering upper and lower sides of a laminate structure constituting a battery with a pair of film materials respectively and bonding the pair of film materials together sequentially in a process direction from one end of the pair of film materials to the other, the method comprising:

overlapping the pair of film materials such that the laminate structure is sandwiched therebetween, and sealing one end of an overlapping part of the overlapped pair of film materials, the one end being located at an upstream of the process direction, bonding the overlapped pair of film materials together at one or each of side portions thereof extending along the process direction sequentially in the process direction, while pressing a middle portion of the overlapped pair of film materials sequentially in the process direction to thereby degas an internal space between the overlapped pair of film materials, the middle portion being located between each of the side portions, and providing the laminate structure with a terminal that protrudes from one of the side portions in a length direction of the terminal, and wherein the process direction is perpendicular to the length direction of the terminal, and wherein the side portions are bonded in advance of pressing the middle portion as viewed with respect to a position corresponding to a single straight line orthogonal to the process direction.

2. The method according to claim 1, wherein a plurality of embossed portions are formed on at least one of the pair of film materials, and a portion corresponding to the internal space between the pair of film materials is surrounded by the plurality of embossed portions and hypothetical lines connecting the plurality of embossed portions.

3. The method according to claim 1, further comprising, prior to sealing one end of the overlapping part of the overlapped pair of film materials, continuously or intermittently sending out the overlapped pair of film materials which are in a strip form while maintaining the overlapped pair of film materials facing each other, and feeding the sent-out overlapped pair of film materials, wherein sealing one end of the overlapping part of the overlapped pair of film materials and bonding the overlapped pair of film materials together are repeated in accordance with the sending-out of the strip-formed overlapped pair of film materials to thereby continuously or intermittently manufacture the secondary battery having a film package.

* * * * *